Oct. 20, 1931.    W. T. BARKER, JR    1,828,216
METHOD OF AND APPARATUS FOR FEEDING MOLTEN GLASS
Filed Aug. 29, 1928    5 Sheets-Sheet 2

Witness:
Winslow B. Thayer.

Inventor;
William T. Barker Jr.
by Robson D Brown
Attorney

Oct. 20, 1931.  W. T. BARKER, JR  1,828,216
METHOD OF AND APPARATUS FOR FEEDING MOLTEN GLASS
Filed Aug. 29, 1928  5 Sheets-Sheet 3
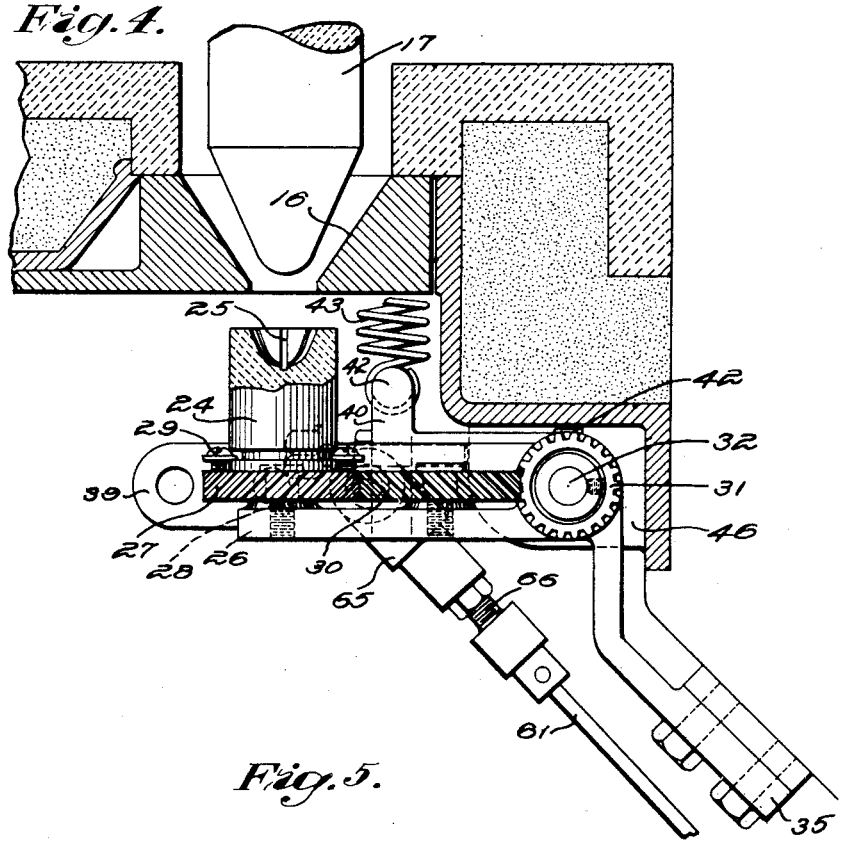
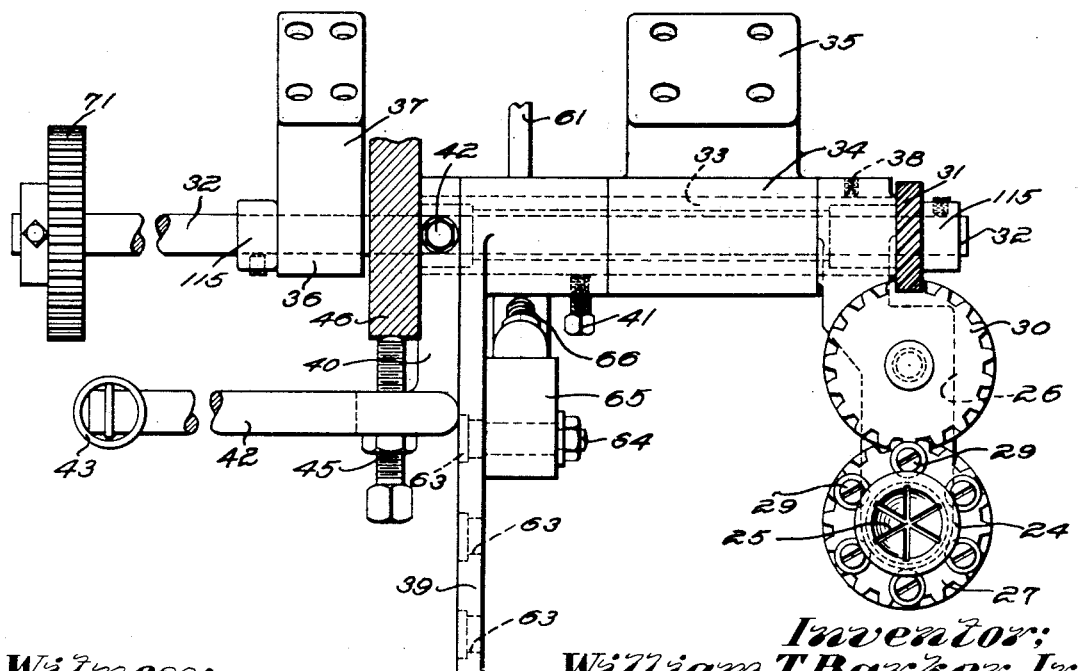
Witness:
Winslow B. Thayer
Inventor:
William T. Barker Jr.
by Robson D Brown
Attorney

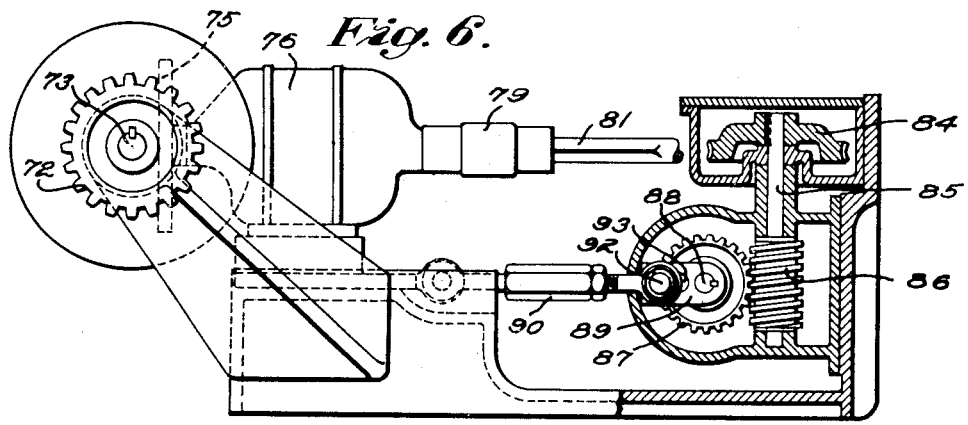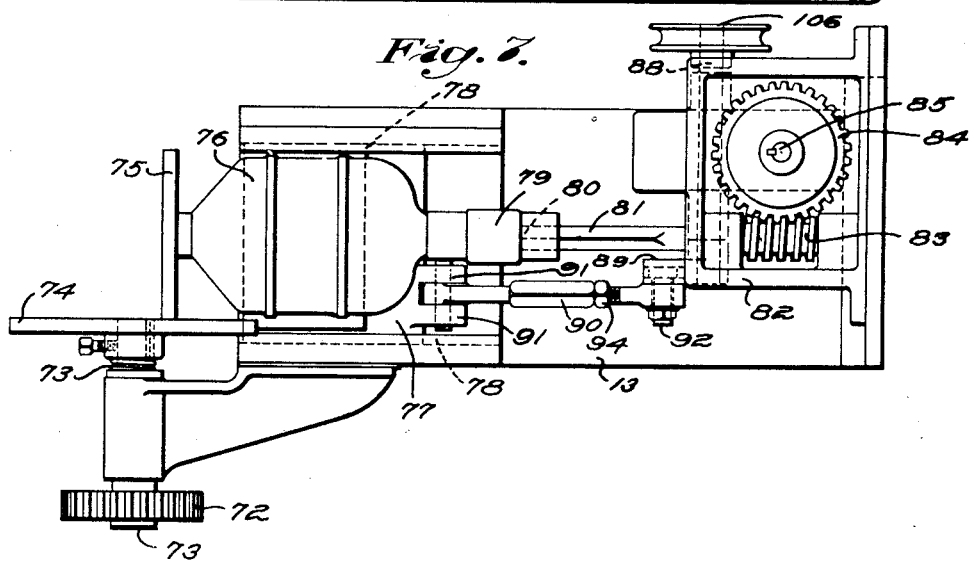

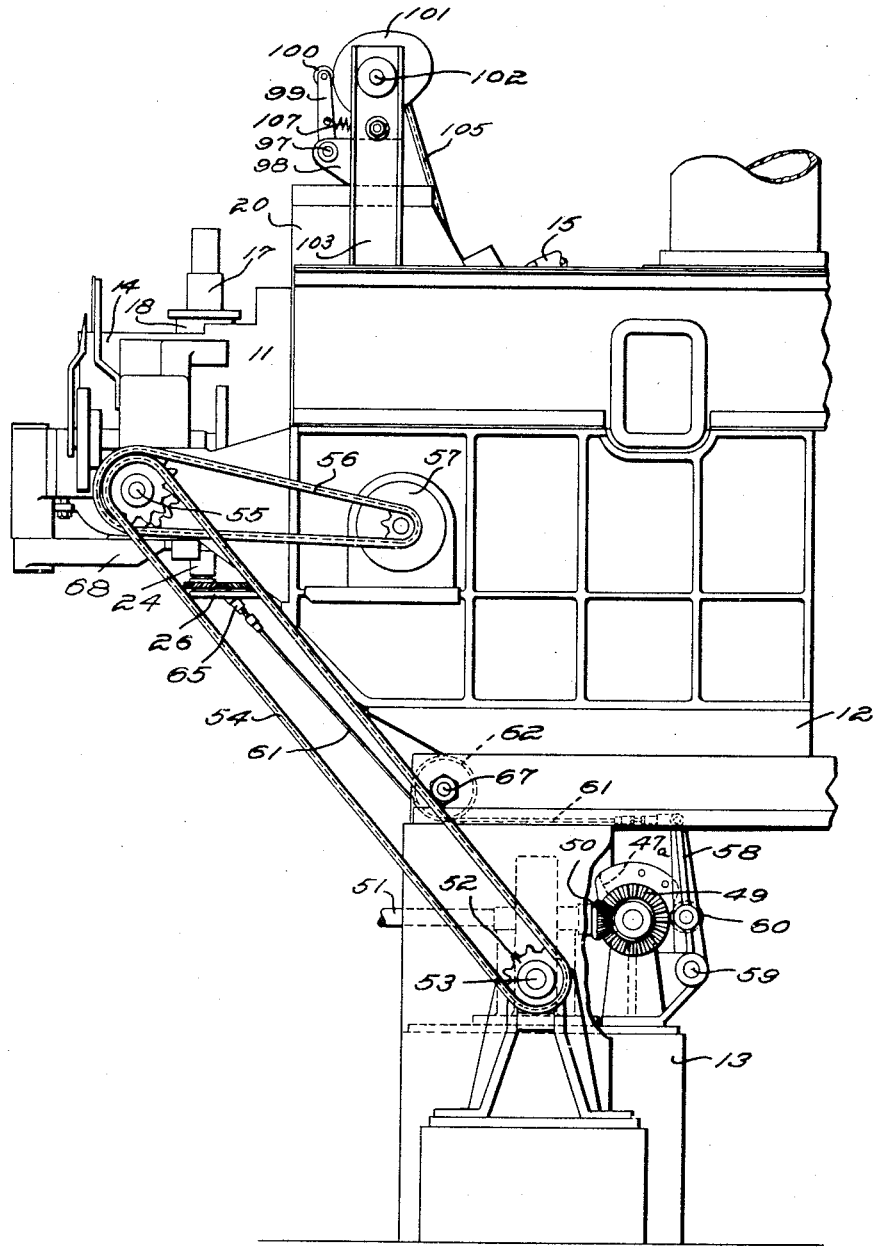

Patented Oct. 20, 1931

1,828,216

UNITED STATES PATENT OFFICE

WILLIAM T. BARKER, JR., OF HARTFORD, CONNECTICUT, ASSIGNOR TO HARTFORD-EMPIRE COMPANY, OF HARTFORD, CONNECTICUT, A CORPORATION OF CONNECTICUT

METHOD OF AND APPARATUS FOR FEEDING MOLTEN GLASS

Application filed August 29, 1928. Serial No. 302,730.

My invention relates generally to apparatus for and methods of feeding molten glass in predetermined quotas or charges and is particularly adapted for the production by mechanical means of charges adapted for use in the manufacture of marbles or other objects of glass of several different colors.

In the manufacture of glass marbles of the type just mentioned, it is considered desirable to imitate as closely as possible the different colored striations, streaks or bands of marble, agate, onyx or other natural rock. To this end, it is desirable that the streaks or striations of glass of a secondary color, or secondary colors, shall be clearly distinct visually from the glass of the base color and that the lines of demarcation between the glass of the base color and glass of a secondary color, or secondary colors, shall extend more or less irregularly for substantial distances close to or at the surface of the article to be formed, thus causing the finished article to closely resemble the natural rock that is to be imitated. The desired results are not obtained if the different colors blend into one another without the clearly defined lines of demarcation or if the glass of the secondary color or colors is embedded in the glass of the base color so as to be obscured or veiled by the latter.

Prior to the present invention, most glass marbles of the type just mentioned have been made of glass charges gathered by hand, the gatherer collecting on his punty portions of each gather from two or more supplies of differently colored glass and manipulating his punty so as to effect a winding of the glass of a secondary color or colors at or close to the surface of glass of the base color. Attempts prior to the present invention to obtain by automatic machinery glass charges adapted to be formed into glass marbles having the color effects and general appearance above described have encountered many difficulties, including the following: The glass of the base color completely envelops the glass of a secondary color or secondary colors so as to obscure the latter and prevent the appearance of the clearly defined lines or striations which are desired in order to simulate the appearance of marble, agate or other natural rock. When the glass of the secondary color appears at the surface of glass of the base color in the charge, such secondary color is likely to occur in "splotches" and the lines of demarcation between the glass of the base color and the glass of the secondary color are likely not to have the irregular but clearly defined character desired, or to extend along the surface of the charge sufficiently far to give the effect of the natural rock that is to be imitated.

An object of the present invention is to provide methods and apparatus for producing by automatic machinery glass charges embodying several different colors, so distributed that glass marbles formed of such charges have clearly defined streaks or striations and color effects closely resembling those of a natural rock that is to be imitated.

A further object of the invention is to provide methods and apparatus for producing glass charges adapted to be formed into glass marbles or other objects having the desirable features just described and capable of wide variations as to the color effects and the relative arrangement and extent of the different colors of the charges for different marbles.

A still further object of the invention is to effect a considerable economy in the production of glass marbles of the character described by producing the charges for such marbles by automatic machinery at a rate greatly in excess of that which is possible when the charges are produced by hand.

Other objects and advantages of the invention will be apparent from a consideration of the following description when it is considered in conjunction with the accompanying drawings.

The invention contemplates providing a stream of glass of controlled depth, viscosity, temperature, and condition of a predetermined base color in a glass container having a discharge outlet in its bottom. Smaller streams or rivulets of glass of a secondary color, or secondary colors, and also of suitable condition, temperature, and viscosity are caused to descend to the glass of the base color in the container so that the glass issuing downwardly from the outlet and accumulating in suspension below the outlet will have the base color interspersed with streaks of the secondary color or colors extending from within to, or close to, the surface of the accumulating glass charge. In order to get the desired distribution of the streaks of the secondary color at the surface of the body of the charge as it is being formed below the outlet, a rotary cup may be brought periodically to a position to receive and engage with the lower portion of the accumulating charge and the cup is then given a controlled varying rotary movement so as to twist the glass of the accumulating charge and thereby to twist or wind the streaks of glass of the secondary color around the body of the accumulating charge. The charge thus formed is adapted after severance to be formed in a marble forming machine into a marble which will have clearly defined lines of demarcation between the different colors thereof and will appear to comprise the necessary striations or streaks of different colors to resemble agate, onyx, marble or other natural rock. The duration of the period of twisting action of the accumulating mold charge by the cup can be varied to produce different effects in marbles made from different mold charges. The invention also contemplates a wide range of adjustment of the variation of speed and change of the character of rotation of the cup while it is in engagement with the accumulating mold charges so that successive marbles will be somewhat different in appearance from one another.

In the drawings:

Fig. 4 is a fragmentary relatively enlarged vertical sectional view, showing the outlet portion of the glass feeding container of the improved apparatus together with the glass twisting cup in position below the outlet and portions of the operating mechanism for such cup;

Fig. 5 is a fragmentary plan sectional view of the glass twisting cup and associated operating mechanism therefor;

Fig. 6 is a view, mainly in elevation but partly in section, of a motor and parts of the operating mechanism for rotating the cup at a varying speed;

Fig. 7 is a plan view of the structure shown in Fig. 6; and

Fig. 8 is a side elevation of the improved apparatus as viewed at the side opposite to that shown in Fig. 1.

Figure 1:
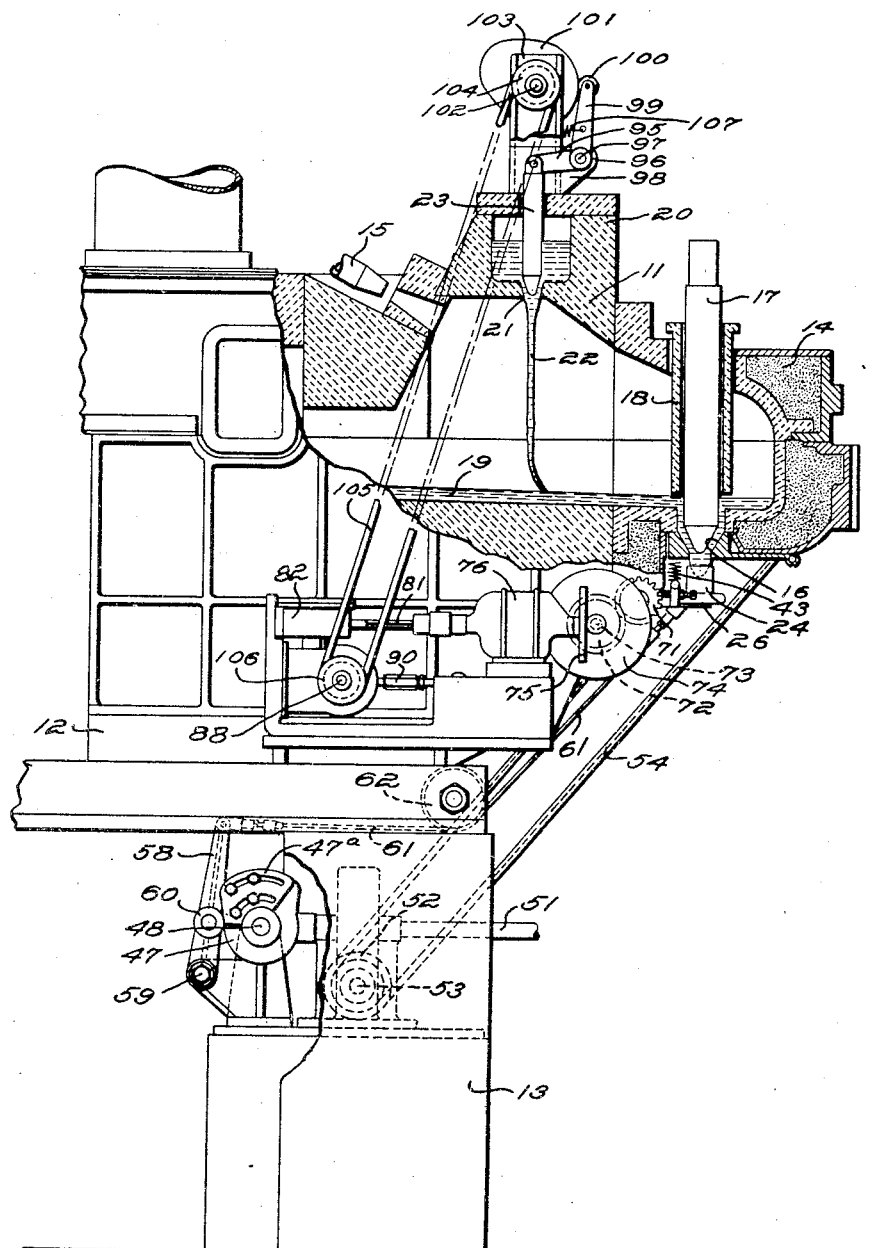
Figure 1 is a side elevation, partly in section, of glass feeding apparatus adapted for use in carrying out the invention and embodying certain structural aspects of the invention, certain parts being omitted.

Apparatus embodying physical features of the invention and adapted for the performance of the improved methods of the invention may comprise a glass container 11 carried by a frame structure 12 which in turn may be supported on a base structure 13, Fig. 1. The glass container 11 is shown in Fig. 1 as being made of refractory material and as constituting a forehearth which may be appurtenant to a glass melting furnace (not shown) or like source of molten glass. The forehearth 11 may be suitably insulated, as at 14 and provided with suitable heating means, such as the burner indicated at 15 in Fig. 1, for maintaining any desired heat condition within the forehearth. The forehearth is provided adjacent to its outer end with an outlet 16 in its bottom for the downward discharge of molten glass. A refractory implement 17 depends through a suitable opening at the top of the forehearth into the glass and is substantially in axial alignment with the outlet. The implement 17 may be reciprocated vertically by suitable means, (not shown) so as to aid in controlling the discharge of glass through the outlet, in suspending the issued glass in successive masses below the outlet, and in shaping the masses of glass while they are accumulating in suspension below the outlet. It also is intended that the operating mechanism for the implement 17 shall be capable of adjustment to permit the implement to remain stationary, if desired, with the lower end of the implement adjusted vertically with respect to the discharge end of the outlet so as to permit a controlled gravity flow through the outlet.

A refractory tube 18 surrounds the implement 17 and may be adjusted vertically so as to be disposed entirely above the level of the glass in the forehearth as shown in Fig. 1, to dip into the glass in the forehearth so as to regulate the flow of glass to the outlet and hence the weight of successive charges periodically severed in suspension from glass issuing through the outlet, or to contact with the bottom of the forehearth at the upper end of the outlet so as to entirely shut off flow of glass to the outlet for any useful purpose, as to permit removal and replacement of the outlet ring or other work at or adjacent to the outlet. The operating and adjusting mechanism for the tube 18 and the operating and adjusting mechanism for the implement 17 may be substantially the same as mechanism included in the well known Hartford-Empire single feeder and in fact the forehearth as described so far may comprise an outlet structure and other parts similar to corresponding parts of the Hartford-Empire single feeder. A gate, (not shown) preferably is provided for regulating the depth of glass in the forehearth, as in the case of the aforesaid Hartford-Empire single feeder.

The stream of molten glass indicated at 19 in Fig. 1 flows from the left from a source of supply toward the outlet 16. Such glass may have any desirable color that is to be the base color of the marbles or other objects which are to be formed. This glass is ordinarily transparent glass tinted with any desired color, such as red, blue or brown.

Glass usually more opaque of a secondary color, which may be white, or of secondary colors is added to the shallow glass stream 19 in the form of smaller streams or rivulets. The forehearth top therefore may be formed to provide an auxiliary glass container or glass feed chamber for holding glass of a secondary color or of secondary colors and is provided with flow orifices 21 in its bottom through which glass may pass downwardly in streams or rivulets, as at 22 in Fig. 1, onto the stream of glass of the base color in the forehearth 11. The orifices 21 may be spaced transversely of the forehearth 11 and flow of glass through each of the orifices 21 may be regulated by a vertically reciprocating regulating implement 23 which on its downward movement reduces the effective size of the associated flow orifice 21 so as to restrict the flow through the latter and on its upstroke enlarges the effective size of the associated orifice 21 and permits a greater flow therethrough. It is obvious that the auxiliary chamber 21 may be divided by vertical partitions between the respective orifices 21 into individual compartments, in each of which a glass of a secondary but individually different color may be placed. Provision is made for reciprocating the respective regulating implements 23 successively so that the different streams 22 will vary in cross section in a different manner from one another. The operating mechanism for such regulators will be hereinafter described.

Figure 2:
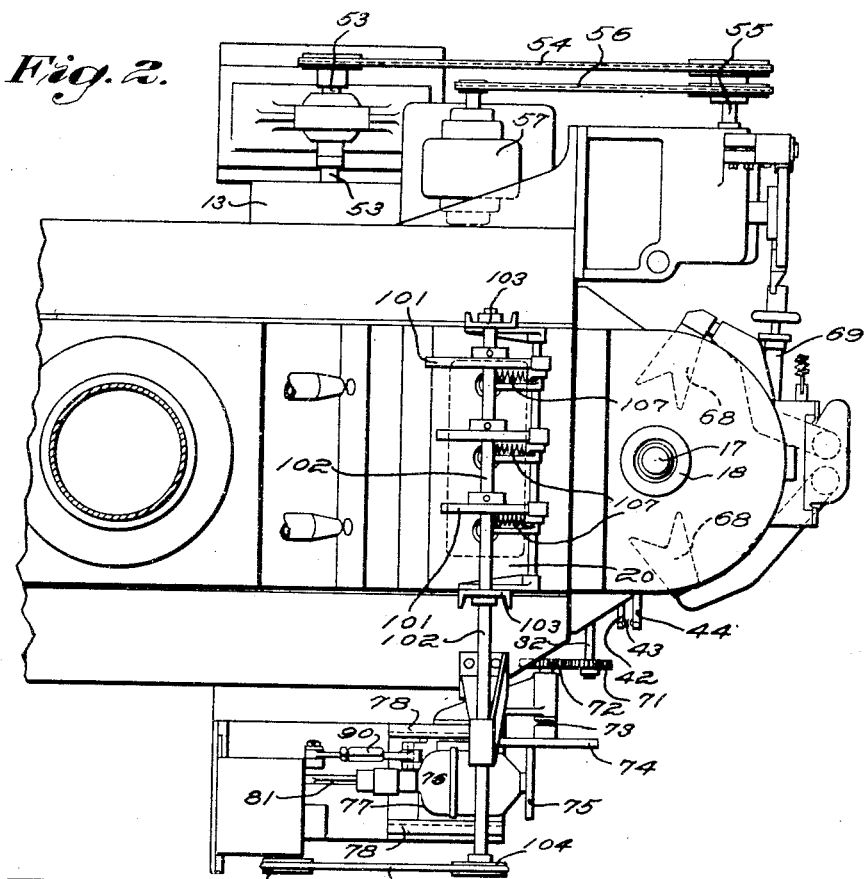
Fig. 2 is a plan view of the structure shown in Fig. 1 and showing also shear blades and operating mechanism therefor.

Glass from the main stream 19 having the base color and glass from the relatively small streams or rivulets 22 of a secondary color or colors will pass downwardly through the outlet 16 around the end of the implement 17 and will accumulate in suspension below the outlet in a mass having a base color and streaks of the secondary color or colors appearing at the surface of the base color. A cup 24, Figs. 1, 2 and 4, is brought to a position below the outlet to engage the lower end of the glass accumulating for each charge. The cup is rotated at a varying speed so as to twist the accumulating glass and thereby to cause the streaks of glass of the secondary color to be twisted around the body of the charge and to appear therein as irregular but clearly defined and distinct striations of a different color in glass of the base color, thus producing the desired imitation of the color and line effects of marble, agate, onyx or like natural rock.

The cup 24 may have grooves 25 provided in its inner surface in order to assure a positive gripping or adhesive engagement of the cup with the glass received therein.

The cup preferably is made of a material such as brush carbon to which the glass is not likely to stick when the cup is at a relatively high temperature. Such cup may be mounted for rotation about its axis and for swinging movement to and from a position below and in substantial alignment with the outlet. The cup supporting and operating mechanism may comprise an arm 26, Figs. 4 and 5. A gear 27 is rotatably mounted on the arm 26 by means of a pivot element 28 having a portion threaded into a suitable opening in the arm 26 as shown in Fig. 4. The cup is secured removably on the gear 27 by screws 29, Fig. 5, so that the cup 24 and the gear 27 rotate as a unit. A gear 30, also rotatably supported on the arm 26, derives motion from a helical gear 31 on a driven shaft 32 and causes rotary motion of the gear 27 and consequently of the cup 24. The shaft 32 extends through a rock sleeve 33 which is journaled in a bearing 34 on a bracket 35. The bracket 35 is adapted for attachment to a suitable part of the supporting structure for the forehearth. The shaft 32 also is journaled in a bearing portion 36 of a bracket 37 which can be attached to any suitable part of the supporting frame work for the forehearth. Mechanism for driving the shaft 32 at a varying speed will be presently described.

The arm 26 is secured to the sleeve 33, as by a set screw 38, Fig. 5, so that the gear 30 will be kept continuously in mesh with the gear 31 although the arm 26 and the sleeve 33 may turn angularly as a unit about the axis of the shaft 32. The sleeve 33 has rocker arms 39 and 40, respectively, secured thereto, as by the set screws 41 and 42 respectively, Fig. 5. Stop collars 115, Fig. 5, are secured on the shaft 32 for cooperating with fixed members adjacent to the shaft to prevent any undesirable axial movement of the shaft or of the parts carried by the shaft.

A coil spring 43 connects one end of the rocker arm 40 with a convenient fixed support, as to a laterally extending projection 44 at the side of the forehearth, see Fig. 2. This spring is under sufficient tension to resist swinging movement of the cup downwardly and rearwardly about the axis of the shaft 32 from the position shown in Figs. 1 and 4. The limit of the upward movement of the cup in response to the actuation of the spring 43 may be varied by adjusting a stop screw 45 which is threaded through a portion of the rocker arm 40 and is adapted to abut a fixed stop member 46 as the cup reaches its upwardly swung position in alignment with the outlet.

Figure 3:
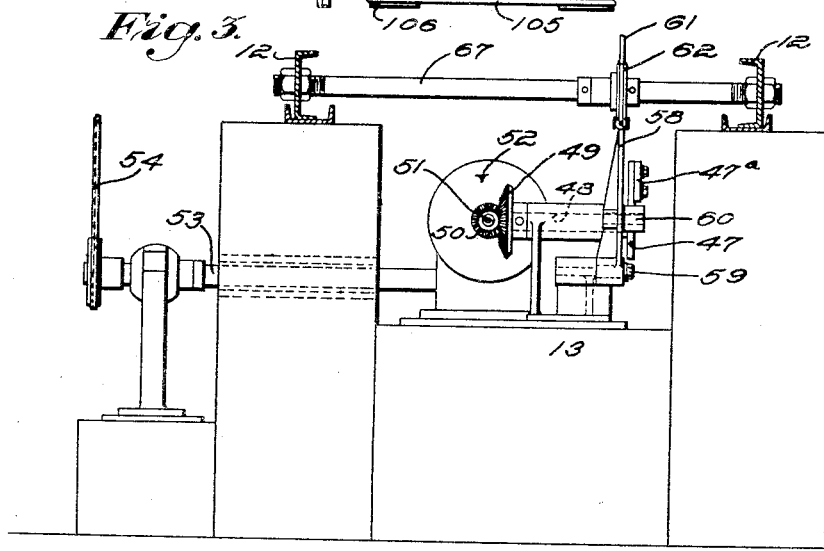
Fig. 3 is an end view partly in vertical section of the lower portion of the structure shown in Fig. 1 as viewed from the left in that figure.

The downwardly swinging movement of the cup against the action of the spring 43 is caused periodically by a cam 47, Figs. 1 and 3, and cam actuated mechanism that is connected with the rocker arm 39. The cam 47 is secured on a shaft 48 which is mounted in a suitable bearing on the supporting base structure 13. The shaft 48 carries a bevel gear 49 in mesh with a bevel gear 50 on a shaft 51. The latter is driven by a worm and worm wheel connection, indicated at 52 in Fig. 1, with a shaft 53, Figs. 1 and 3. The shaft 53 is driven by chain and sprocket connections indicated generally at 54 with a second motion shaft 55, Fig. 2, which in turn may be driven by chain and sprocket connections indicated at 56 with the drive shaft of a motor 57, Figs. 2 and 8. The motor 57 is mounted on a suitable part of the supporting structure of the apparatus.

A lever 58 is fulcrumed at one end at 59 on a convenient part of the base structure for the forehearth and carries a cam roll 60 which bears against the working edge of the cam 47. The lever 58 is connected at its other end with a flexible link 61 which extends beneath a guide sheave 62, Fig. 1, and is connected at its other end to the rocker arm 39. The flexible link 61 may be connected to the arm 39 at different places along the length of the latter and to this end, the arm 39 is shown in Fig. 5 as being provided with a plurality of transverse openings 63 spaced along the length thereof, each of which is adapted for the reception of a bolt 64 that can be used to connect the arm 39 with a block or clevis 65 which may constitute an end portion of the flexible link. The effective length of the link may be varied by providing an adjustable connection between sections thereof, such as indicated at 66, between the block or clevis 65 and the adjacent section of the link. The guide sheave 62 may be carried by a cross bar 67, that extends between side members of the frame structure 12, as shown in Fig. 3.

The contact of the high portion of the cam 47 with the cam roll 60 will swing the lever 58 about the fulcrum 59 so as to cause movement of the cup 24 downwardly and rearwardly about the axis of the shaft 32 from the position shown in Fig. 1 and against the action of the spring 43. The throw of the arm 26 and consequently the swing of the cup 24 may be varied by changing the place of connection of the flexible link 61 along the rocker arm 39, the length of the link 61 being adjusted as required to keep the same taut when it is connected at different place along the arm 39. The cam 47 includes an adjustable cam lobe 47ª, which is adjustably connected to the remainder of the cam so that it can be adjusted angularly about the axis of rotation of the cam to vary the effective length of the raised portion of the cam. This will vary the duration of the period in each cycle of rotation of the cam during which the cup 24 will be retained in its raised position, as shown in Figs. 1 and 4.

The apparatus includes shear blades 68, Fig. 2, adapted to close beneath the outlet to sever a charge from the suspended glass below the outlet at a time when the cup has been swung downwardly away from the glass. These shear blades may be supported and operated so as to be periodically closed and opened by mechanism generally indicated at 69, Fig. 2. Such mechanism preferably is substantially the same in essential respects as the supporting and operating mechanism for the shear blades of the well-known Hartford-Empire single feeder and consequently a description thereof is deemed unnecessary herein. It may be noted, however, that such shear operating mechanism receives motion through suitable connections (not fully shown) from the shaft 55, which is the same shaft that serves as a second motion shaft of the hereinbefore described driving mechanism for periodically lowering the cup from the position shown in Figs. 1 and 4. Adjustment of the timed relation between the swinging movements of the cup and the periodic operations of the shear blades thus will be dependably maintained.

The mechanism for rotating the shaft 32, at a controlled varying speed to effect rotation of the cup 24 at a varying speed, may comprise a gear 71 carried by the shaft 32 and in mesh with a gear 72 on a driven shaft 73. (See Figs. 2, 6 and 7.) The driven shaft 73 carries a driven friction disc 74, with which a friction drive disc 75 on one end of the drive shaft of a motor 76, Fig. 7, is in frictional contact. The motor 76 has its base 77 mounted to slide in horizontal guideways 78, on a platform which may form part of the base structure of the apparatus. The sliding movement of the motor 76, along the guideways 78, will slide the friction drive disc 75 radially of the friction driven disc 74 and thus periodically will gradually accelerate the speed of rotation of the cup 24, as the drive disc 75 moves toward the center of the disc 74, and periodically gradually decelerate the rate of rotational movement of the cup 24, as the drive disc 75 moves radially toward the edge of the disc 72. The amplitude of the sliding movement of disc 75, while in contact with disc 74 may be varied, by means to be presently described, and the position of the limits of the sliding movement of the disc 75 on the disc 74 may be adjusted so that the entire sliding contact of the disc 75 with the disc 74 will take place at one side of the center of the latter or the disc 75 will move back and forth across the center of the disc 74, thereby causing a reversal in the direction of rotation of the cup with a momentary dwell between rotational movements of the cup 24 in different directions.

The rotation of the drive shaft of the motor 76 may be utilized to effect the sliding movement of the motor in guideways 78 and consequently to alter the rotation of the cup 24. With this in view, the second end of the motor drive shaft may be extended as indicated at 79, Fig. 7, and provided with a squared axial socket 80, in which a squared end of a second motion shaft 81 may slide. The shaft 81 is journaled in suitable bearings in a frame work 82 on a portion of the base structure 13, and is provided with a worm 83 in mesh with a worm wheel 84 on a driven shaft 85. The driven shaft 85 carries a worm 86 in mesh with a worm wheel 87, on a crank shaft 88, Figs. 6 and 7. A crank arm 89 is secured to the crank shaft 88 and is connected by an adjustable connecting rod 90 with ears 91 on the motor base. The connection between the connecting rod 90 and the crank arm 89 is adjustable and may be effected by the use of a crank pin 92, which can be secured in adjusted position along a slot 93 that extends longitudinally of the crank arm. The connecting rod 90 comprises sections adjustably connected as at 94 so that the effective length of the connecting rod can be varied. Adjustment of the length of the connecting rod, without changing the place of the connection between the connecting rod and the crank arm will adjust the limits of the reciprocatory sliding contact of the friction disc 75 with the friction disc 74 as the crank shaft 88 rotates and thus will change both the limits of a period of speed change of the rotating cup without changing the rate at which the gradual variation of speed of rotation of the cup will take place. Change of the place of connection of the connecting rod 90 with the crank arm 89 will change the amplitude of the throw or reciprocation of the disc 75 on the disc 74 and will change the rate at which the variation in the speed of rotation of the cup 24 takes place.

Reciprocation of the regulators 23 in the auxiliary feed chamber 20 may be effected to vary successively the flow of glass of the secondary color through the respective orifices 21. The mechanism for operating one of the regulators 23 will now be described and will suffice as a description of the mechanism of each of the other regulators. By referring to Fig. 1, it will be noted that the regulator 23, shown therein, is connected at its upper end to the lower arm 95 of a bell crank lever 96, which is fulcrumed on a horizontal shaft 97. The shaft 97 may be supported by brackets 98 on the top of the auxiliary feed chamber. The bell crank lever also includes an upwardly extending arm 99 which carries a cam roll 100 in contact with a cam 101. The cam 101 is mounted on a cam shaft 102 which is suitably supported, as by the brackets 103, Fig. 2, above the auxiliary feed chamber 20. The cam shaft 102 has an end portion thereof extended laterally of the forehearth 11, above the hereinbefore described driving mechanism for effecting the rotation of the cup, and a pulley 104 on the extended portion of the cam shaft is shown as being connected by a belt 105 with a pulley 106 on one end of the crank shaft 88. Chain and sprocket connections, or a gear train, may be employed if a more positive driving connection between the source of power and the cam shaft 102 should be desired. The cam shaft 102 thus will be rotated at a slow speed. The cams 101 preferably are shaped so as to reciprocate the regulators 23 slowly and to continuously vary the effective size of the flow through each orifice 21. The cams can be adjusted angularly about the cam shaft so as to obtain any desired initial relative setting of the cams and preferably so that the respective streams of glass 22 from the different orifices always will be kept different from one another. Springs, as at 107, Figs. 1, 2 and 8, hold the cam rolls 100 continuously against the working faces or edges of the cams 101.

The operation of the apparatus which has been described will be readily understood. The stream of glass at 19 in the flow channel of the forehearth is relatively shallow and the rivulets or smaller streams 22 descending thereon from the auxiliary feed chamber 20, will move along converging paths with glass of the stream 19 toward the outlet. Discharge of glass through the outlet may be accelerated periodically by a downward movement of the plunger 17, so as to prevent attenuation of glass in suspension below the outlet and to aid in shaping such suspended glass. The upward movement of the plunger 17 may be employed to cause a necking-in of the suspended glass when sufficient glass for a charge has accumulated in suspension below the outlet. Such suspended charge of glass may be severed at the attenuated portion by shears 68 and the stub of glass left after the severing operation may be retracted toward the outlet by the upward movement of the plunger 17 or the downward movement of such stub may be substantially stopped or retarded. The reciprocating movement of the implement 17 may be omitted, particularly when the glass being fed is relatively cool and viscous and the charges to be obtained are relatively short and compact and are not likely to attenuate to any great extent while accumulating in suspension below the outlet. In that event the plunger 17 is adjusted so as to permit a predetermined regulable flow of glass around the end thereof through the discharge end of the outlet. Whether or not the implement 17 is reciprocated or is maintained stationary in a relatively low position during feeding, it is intended that the issuing glass for a charge of a size suitable for use in the manufacture of the glass marble, or like object shall accumulate in suspension below the outlet. This accumulating charge may comprise a body of the selected base color with longitudinal streaks of the secondary color close to or at the surface of the suspended glass. As glass begins to accumulate in suspension below the outlet, the cam roll 60 descends from the high portion of the cam 47, so that the spring 43 is permitted to swing the cup 24 upwardly to position below the outlet to receive and engage with the lower end portion of the descending glass. The cup is given a slow and continuously varying rotary movement by the mechanism hereinbefore fully described so that the glass charge that is accumulating in suspension from the outlet is twisted about its vertical axis, thereby extending the streaks of the glass of the secondary color around the axis of such glass and producing the sharply defined irregular lines of demarcation between the different colors of glass. The charge thus formed is severed from the glass at the outlet after a downward movement of the cup and is suitable to be formed by a marble forming machine into a glass marble which will have the striations and sharply defined lines of demarcations between different colors required to produce the desired resemblance to natural marble, agate, onyx, or other rock that is to be imitated. Consequently glass marbles which meet the requirements of the trade for which they are intended can be quickly and satisfactorily manufactured by the use of the improved apparatus.

The automatic variation in the speed of rotation of the cup 24 will provide the desired irregularity in the color effects and appearance of successive marbles. Such effects can be varied by the adjustments hereinbefore described.

While I have shown and described a cup which is moved to and from a position to receive and engage the lower end of the discharged glass below the outlet; it is to be understood that the invention is not restricted to such specific means for effecting the twisting or rotation of the descending glass but that any suitable means may be employed to rotate or twist the issuing glass for the particular purpose described or for any other useful purpose without departing from the spirit and scope of the invention. For example, an annular orifice ring, or other annular means, might be employed at the lower end of the orifice in lieu of the specific cup shown in the drawings and given the movements required to effect the desired twisting or rotary movement of the glass below or at the outlet.

It also is obvious that glass charges may be produced by the methods and by the use of apparatus embodying the invention for fabrication into various articles of glassware other than marbles or like objects, and that the glass components of such charges are not necessarily required to have different colors.

The invention may be varied as to the combination, arrangement and character of the elements of the structural embodiment thereof illustrated in the accompanying drawings and as to the arrangement and combination of steps of methods for carrying out the invention without departing from the spirit and scope of the invention, which is not to be limited except by a fair interpretation of the terms of the appended claims.

I claim as my invention:—

1. The method of obtaining variegated glass charges which comprises flowing molten glass of a base color through a flow channel to a discharge outlet in the bottom of the flow channel, combining with said glass in the flow channel a plurality of smaller streams of glass of a secondary color and discharging the combined streams through the outlet in successive suspended masses, each of such masses having a body formed mainly of glass of the base color and having streaks of glass of the secondary color clearly visible at the surface thereof, twisting each suspended mass about its longitudinal axis during its formation and with respect to the glass entering the outlet to distribute said streaks of glass of the secondary color at the surface of the body of the suspended mass in imitation of the streaks or striations of a body of variegated natural rock, altering different charge masses by varying the durations of the periods of twisting thereof, and severing each suspended mass from the oncoming glass.

2. The method of obtaining variegated glass charges which comprises flowing molten glass of a base color through a flow channel to a discharge outlet in the bottom of the flow channel, combining with said glass in the flow channel a plurality of smaller streams of glass of a secondary color and discharging the combined streams through the outlet in successive suspended masses, each of such masses having a body formed mainly of glass of the base color and having streaks of glass of the secondary color clearly visible at the surface thereof, twisting each suspended mass about its longitudinal axis during its formation and with respect to the glass entering the outlet to distribute said streaks of glass of the secondary color at the surface of the body of the suspended mass in imitation of the streaks or striations of a body of variegated natural rock, and altering the appearance of successive severed charges by varying the time in the formation of the charges at which the twisting of the glass thereof is effected.

3. The method of obtaining variegated glass charges which comprises flowing molten glass of a base color through a flow channel to a discharge outlet in the bottom of the flow channel, combining with said glass in the flow channel a plurality of smaller streams of glass of a secondary color and discharging the combined streams through the outlet in successive suspended masses, each of such masses having a body formed mainly of glass of the base color and having streaks of glass of the secondary color clearly visible at the surface thereof, twisting each suspended mass about its longitudinal axis during its formation and with respect to the glass entering the outlet to distribute said streaks of glass of the secondary color at the surface of the body of the suspended mass in imitation of the streaks or striations of a body of variegated natural rock, and altering the appearance of different severed charges by changing the direction of twisting of the charges during their formation.

4. The method of obtaining variegated glass charges which comprises flowing molten glass of a base color through a flow channel to a discharge outlet in the bottom of the flow channel, combining with said glass in the flow channel a plurality of smaller streams of glass of a secondary color and discharging the combined streams through the outlet in successive suspended masses, each of such masses having a body formed mainly of glass of the base color and having streaks of glass of the secondary color clearly visible at the surface thereof, twisting each suspended mass about its longitudinal axis at a varying speed during its formation and with respect to the glass entering the outlet to distribute said streaks of glass of the secondary color at the surface of the body of variegated natural rock, and altering the appearance of different severed charges by changing for different charges the rate at which the variation in the speed of twisting takes place.

5. The method of obtaining variegated glass charges which comprises flowing molten glass of a base color through a flow channel to a discharge outlet in the bottom of the flow channel, combining with said glass in the flow channel a plurality of smaller streams of glass of a secondary color and discharging the combined streams through the outlet in successive suspended masses, each of such masses having a body formed mainly of glass of the base color and having streaks of glass of the secondary color clearly visible at the surface thereof, twisting each suspended mass about its longitudinal axis at a varying speed during its formation with respect to the glass entering the outlet to distribute said streaks of glass of the secondary color at the surface of the body of variegated natural rock, and altering the appearance of different severed charges by changing the high and low speed limits of the twisting action on the glass for said different suspended charge masses without changing the rate of speed variation between such limits.

6. The method of obtaining variegated glass which comprises combining a plurality of differently colored molten glasses so as to maintain clear lines of demarcation between the different colors, and periodically varying the relative quantities of the different colored glasses thus combined.

7. The method of feeding molten glass in variegated charges, which comprises combining a plurality of streams of differently colored molten glasses so as to maintain clear lines of demarcation between the different colors, discharging the combined glasses through an orifice in successive preformed charges, and twisting the charges during the formation thereof by a force applied entirely below the plane of the upper end of the discharge orifice and varying during the formation of each charge.

8. The method of feeding molten glass in variegated charges which comprises combining a plurality of streams of differently colored molten glasses, discharging the combined glasses through an orifice in successive preformed charges, each having substantial portions of the differently colored glasses clearly distinct at the surface thereof, and twisting the charges at a varying speed during their formation by a force applied entirely below the plane of the upper end of the discharge outlet.

9. The method of obtaining a series of separate compact variegated glass charges, each appropriate to be formed into a glass marble or like article, which comprises establishing flow of a shallow stream of molten glass of a base color to a downwardly opening discharge outlet, discharging onto said stream a plurality of convergent smaller streams of molten glass each of a color different from said base color, regulating the flow of said combined streams through the outlet to produce a series of suspended compact masses of glass below the outlet, temporarily engaging each of said suspended masses in its turn during the formation thereof and imparting a torque thereto by a force applied entirely below the plane of the upper end of the outlet to control the distribution of streaks of glass from the smaller streams in glass of the base color, and severing each of said suspended masses from glass of the succeeding mass when the desired distribution of colors at the surface of said mass has been obtained.

10. Apparatus for feeding molten glass comprising a glass feeding chamber having a discharge outlet, means for combining a plurality of regulable streams of glass of a plurality of different colors and for discharging glass of the combined streams through said outlet to produce a series of preformed suspended charge masses below the outlet, a rotary supporting member for temporarily engaging each of said charge masses during its formation, means for rotating said supporting member to twist the charge mass with respect to the glass entering the outlet so as to aid in controlling the relative arrangement of the component colors of the charge mass, and automatic means for varying the speed of rotary movement of said supporting member during its engagement with each of said charge masses.

11. Apparatus for feeding molten glass comprising a glass feeding chamber having a discharge outlet, means for controlling the discharge of glass of a plurality of different colors through said outlet to produce a series of preformed suspended charge masses below the outlet, a rotary supporting member for temporarily engaging each of said charge masses during its formation, means for rotating said supporting member to twist the charge mass with respect to the glass entering the outlet so as to aid in controlling the relative arrangement of the component colors of the charge mass, and means for varying the time in the formation of a mold charge mass at which such mass is engaged by said supporting member.

12. Apparatus for feeding molten glass comprising a glass feeding chamber having a discharge outlet, means for controlling the discharge of glass of a plurality of different colors through said outlet to produce a series of preformed suspended charge masses below the outlet, a rotary supporting member for temporarily engaging each of said charge masses during its formation, means for rotating said supporting member to twist the charge mass with respect to the glass entering the outlet so as to aid in controlling the relative arrangement of the component colors of the charge mass, and means for varying the direction of rotary movement of said supporting member.

13. Apparatus for feeding molten glass comprising a glass feeding chamber having a discharge outlet, means for controlling the discharge of glass of a plurality of individually distinct characters through said outlet to produce a series of preformed suspended charge masses below the object, a rotary supporting member for temporarily engaging each of said charge masses during its formation, means for rotating said supporting member at a varying speed to twist the charge mass with respect to the glass entering the outlet so as to aid in controlling the relative arrangement of the components of the charge mass, and means for altering the rate at which the variation of speed of said rotary motion of the supporting member takes place.

14. Apparatus for feeding molten glass comprising a glass feeding chamber having a discharge outlet, means for controlling the discharge of glass of a plurality of different colors through said outlet to produce a series of preformed suspended charge masses below the outlet, a rotary supporting member for temporarily engaging each of said charge masses during its formation, means for rotating said supporting member to twist the charge mass with respect to the glass entering the outlet so as to aid in controlling the relative arrangement of the component colors thereof at the surface of the charge mass, and means for adjusting the duration of the period of rotation of said supporting member in a cycle of charge producing operations of said apparatus.

15. Glass feeding apparatus comprising a main feed chamber having a discharge outlet in its base and adapted for the reception of molten glass of a base color, secondary feed means having a plurality of discharge orifices, each opening into said main feed chamber for discharging into the main chamber glass of a color different from the base color, flow regulating means for controlling the issuance of the combined glasses from the outlet of the main chamber, independently adjustable means for periodically varying the effective size of each discharge outlet of the secondary feed means, periodically acting means for temporarily engaging the lower end portion of successive suspended masses of glass issuing from the discharge outlet of the main chamber and for twisting such issuing glass with respect to the glass entering the discharge outlet to aid in controlling the distribution of the component colors thereof, and periodically acting severing means for severing charges from successive issued masses of glass.

16. Glass feeding apparatus comprising means for feeding molten glass of a plurality of different colors through a discharge outlet in successively suspended masses, each having clearly visible portions of different colors at the surface thereof, a rotary member movable to and from position to engage each suspended mass during the formation thereof, means for rotating said supporting member when it is in its glass engaging position to aid in controlling the relative distribution of the differently colored glasses at the surface of the mass, and adjustable means for regulably controlling the duration of the period of engagement of the rotary member with the glass of a suspended mass.

17. Glass feeding apparatus comprising means for feeding molten glass of a plurality of different colors through a discharge outlet in successively suspended masses, each having clearly visible portions of different colors at the surface thereof, a rotary member movable to and from position to engage each suspended mass during the formation thereof, means for rotating said supporting member at a varying speed to alter the distribution of the different component colors of the suspended masses, means for adjusting said supporting member rotating means to vary the rate at which the speed of rotation of the supporting member changes, and means for adjusting said supporting member rotating means to vary the high and low speed limits of the rotary movement of said supporting member without varying the rate of change of rotational speed between said limits.

18. Glass feeding apparatus comprising a main feed chamber having a discharge outlet in its base and adapted for the reception of molten glass, means separate from said main chamber for holding molten glass and having a plurality of discharge outlets through which molten glass may flow in a plurality of separate streams to the glass in the main chamber, a separate reciprocable implement for controlling the size of the stream from each of said second named outlets, and means for reciprocating said implements to constantly vary the size of the stream from each of said second named outlets without stopping flow therethrough, said means for reciprocating the implement being adjustable to regulably time the reciprocations of the respective implements.

Signed at Hartford, Connecticut, this 23rd day of August, 1928.

WILLIAM T. BARKER, Jr.